(12) United States Patent
Imamura

(10) Patent No.: US 6,731,412 B1
(45) Date of Patent: May 4, 2004

(54) IMAGE FORMING DEVICE

(75) Inventor: Seiji Imamura, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 598 days.

(21) Appl. No.: 09/648,636

(22) Filed: Aug. 28, 2000

(51) Int. Cl.$^7$ .................. H04N 1/04; G03G 15/00
(52) U.S. Cl. .................. 358/498; 399/367; 399/371; 271/3.15; 271/7; 271/8.1
(58) Field of Search .................. 358/498, 496, 358/471, 488, 486; 399/379, 380, 371, 367, 374; 271/10.01, 3.15, 3.17, 4.01, 4.08, 4.09, 4.05, 4.06, 186, 7, 8.1, 902; 355/75

(56) References Cited

U.S. PATENT DOCUMENTS

| | | | |
|---|---|---|---|
| 4,916,481 A | * 4/1990 | Iwao | 355/75 |
| 4,975,749 A | * 12/1990 | Tsunoda et al. | 399/374 |
| 5,323,219 A | * 6/1994 | Hamanaka et al. | 399/371 |
| 5,634,635 A | * 6/1997 | Kobayashi et al. | 271/3.16 |
| 5,923,941 A | * 7/1999 | Harada et al. | 399/367 |
| 6,097,852 A | * 8/2000 | Yamamoto | 382/282 |
| 6,120,017 A | * 9/2000 | Tanjo et al. | 271/105 |

FOREIGN PATENT DOCUMENTS

JP  11-38696  2/1999

* cited by examiner

Primary Examiner—Cheukfan Lee
(74) Attorney, Agent, or Firm—Foley & Lardner

(57) ABSTRACT

An imaging device is provided including a script setting plate for setting thereon a script to be read, a script positioning plate located near one end of the script setting plate and supported for up-and-down movements, a script positioning plate supporter selectively taking a support position under the script positioning plate, and a script-pressing cover extending over the script positioning plate and the script setting plate to guide a script against the script setting plate.

14 Claims, 4 Drawing Sheets

Prior Art

IMAGE FORMING DEVICE

FIELD OF THE INVENTION

The present invention relates to an imaging device and a method for pressing a script in place in the imaging device.

DESCRIPTION OF THE BACKGROUND ART

Imaging devices, in general, are provided with a script scale (script positioning plate) for determining the proper position of a script. The script scale is configured to project from the level of the upper surface of a script glass plate (script setting plate) for properly positioning the script. That is, position of the script can be determined by driving the script against the projecting script scale. Conventionally, the script scale was fixed immovably, and the fixed projection caused the problem that the script floated up above the glass surface near the script scale and could not be copied well.

FIG. 6 is a schematic diagram that illustrates a conventional imaging device. Reference numeral 1 refers to a script scale, 2 to a script glass plate, 7 to a script, and 9 to a script-pressing cover. The script scale 1 is configured to project from the level of the upper surface of the script glass 2, and position of the script is determined by driving the script 7 against this projecting portion. However, since the script scale protrudes and disturbs the script-pressing cover to get into close contact with the script near the script scale, the script is liable to float up there. As a result, there is produced a difference in distance from the script to a script scanner between the area near the script scale and the other area. If the difference exceeds the visible depth of focus of the scanner, image noise (blurring of image) is generated.

Accordingly, in order to reduce image noise produced near the script scale, distance between the scanner and the script had to be kept constant with a high level of accuracy. If, however, the script scale projects less, it makes it difficult to properly position the script.

An imaging device employing an automatic script feeder also involved a similar problem involving generation of image noise. FIGS. 5A and 5B illustrate functions of an automatic script feeder. In these drawings, reference numeral 1 designates a script scale, 2 a script glass plate, 7 a script, and 8 an automatic script feeder. The member 8a of the automatic script feeder is a conveyer belt. The conveyer belt 8a is provided to overlie the script scale 1 and the script glass plate 2. FIG. 5A illustrates the function of transporting the script 7 onto the script glass plate 2 by the conveyor belt 8a of the automatic script feeder 8, and FIG. 5B illustrates the function of placing the script 7 in a proper position relative to the script scale 1. There are several types of automatic script feeders. The illustrated feeder is of a kind that drives the script onto the script glass plate by the conveyor belt. That is, the illustrated feeder operates to first transport the script 7 onto the script glass plate 2 by the conveyor belt 8a of the automatic script feeder 8 (FIG. 5A), then place it in a proper position relative to the script scale 1 (FIG. 5B), and then transport it to a script discharge port after reading it. This type of device is advantageous in not requiring an additional script scanner exclusive for the automatic script feeder and enabling the entire imaging device to be manufactured at a low cost. Also in this case, however, since the script scale projects, the script is liable to float up near the script scale and invites the problem of image noise (FIG. 6). Here again, if the script scale is made to project less, it makes it difficult to properly position the script.

SUMMARY OF THE INVENTION

It is therefore an object of the invention to provide an imaging device which generates less image noise near a script positioning plate (script scale), allows a script to easily sit in a proper position, enables the use of an automatic script feeder, and can be manufactured at a low cost.

According to the invention, there is provided an imaging device comprising:

a script setting plate for setting thereon a script to be read;

a script positioning plate located near one end of said script setting plate and supported for up-and-down movements around a second axis approximately intersecting with a first axis connecting said one end of the script setting plate and the other end thereof to selectively take a first position or a second position, such that, in said first position, said script positioning plate lies horizontally in a level for an upper surface thereof to be higher than an upper surface of said script setting plate and makes a level difference between said upper surfaces, and in said second position, said script positioning plate makes substantially no level difference between said upper surfaces;

a script positioning plate supporter selectively taking a support position under said script positioning plate in said first position for supporting same from the bottom thereof or a support release position shifted nearer to said other end to permit a downward rotation of said script positioning plate to said second position, said script positioning plate supporter taking said support position in a standby period ready for reading a script, and taking said support release position in a period for a actually reading a script; and a script-pressing cover extending over said script positioning plate and said script setting plate to guide a script against said script setting plate.

DESCRIPTION OF THE PREFERRED EMBODIMENTS

Embodiments of the invention are described below with reference to the attached drawings. One of the features of this device lies in that, immediately after a reading operation is started by a script scanner, a script scale (a script setting plate) moves down to press the script more effectively.

Figure 1A:
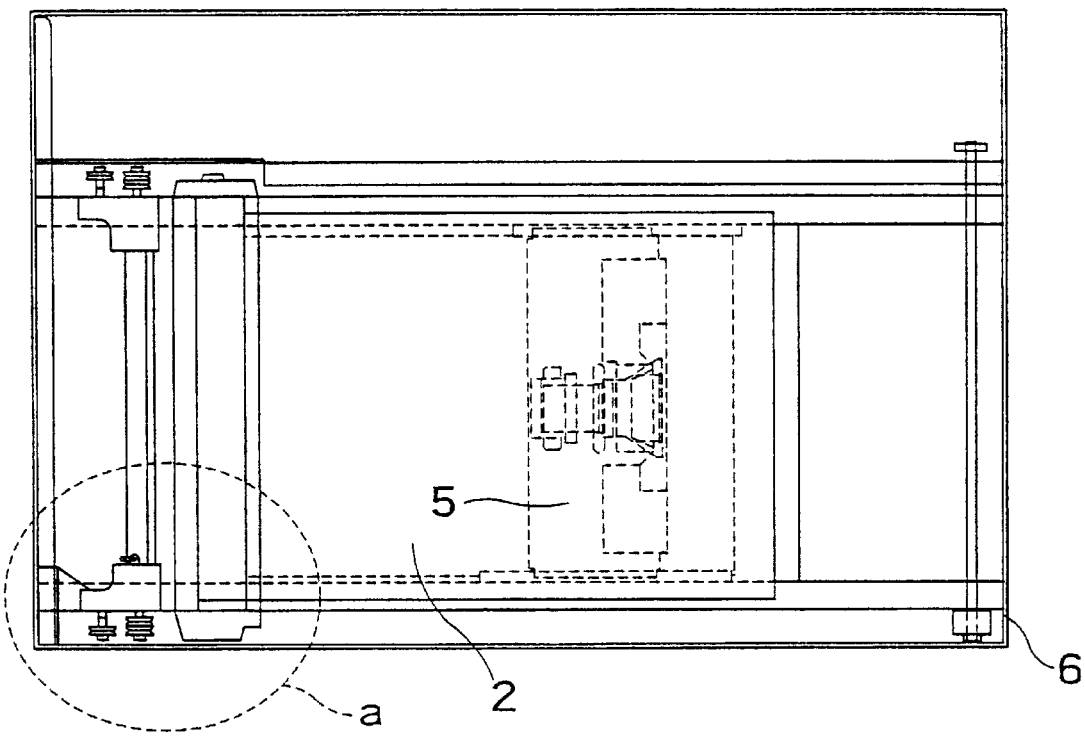
FIGS. 1A and 1B are overall views of an imaging device according to a first embodiment of the invention, and they are a top view and a cross-sectional view thereof, respectively.
Figure 1B:
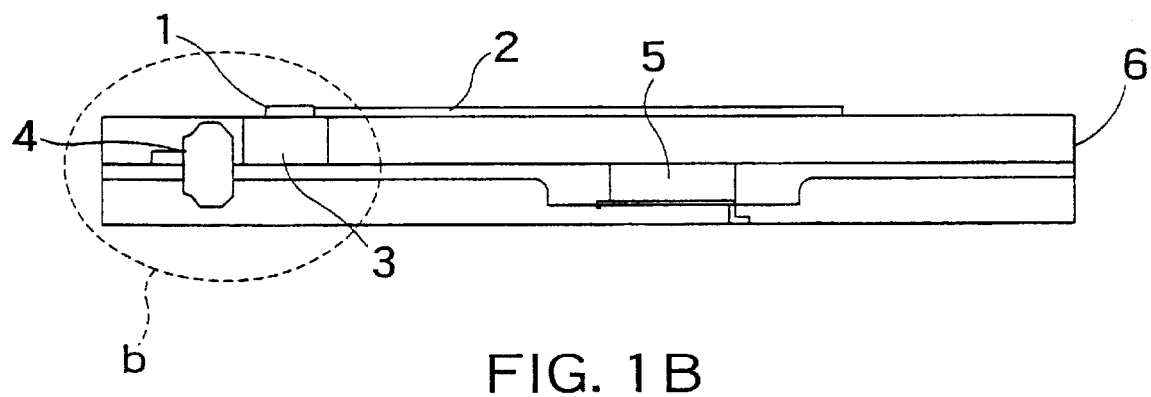

First explained is the configuration of the device. FIGS. 1A and 1B are overall views of the imaging device, and they are a top view and a cross-sectional view thereof, respectively. Reference numeral 1 designates a script scale, 2 designates a script glass plate (script setting plate), 3 designates a first carriage (script scanner), 4 designates a second carriage, 5 designates a lens CCD unit, and 6 designates a scanning frame. Additionally, the device is equipped with an automatic script feeder, not shown. Needless to say, a script may be placed directly on the script glass plate 2 without using the automatic script feeder. FIGS. 1A and 1B illustrate a standby condition ready for script reading, in which the script scanner 3 is located in its initial position below the script glass plate 2.

Figure 2A:
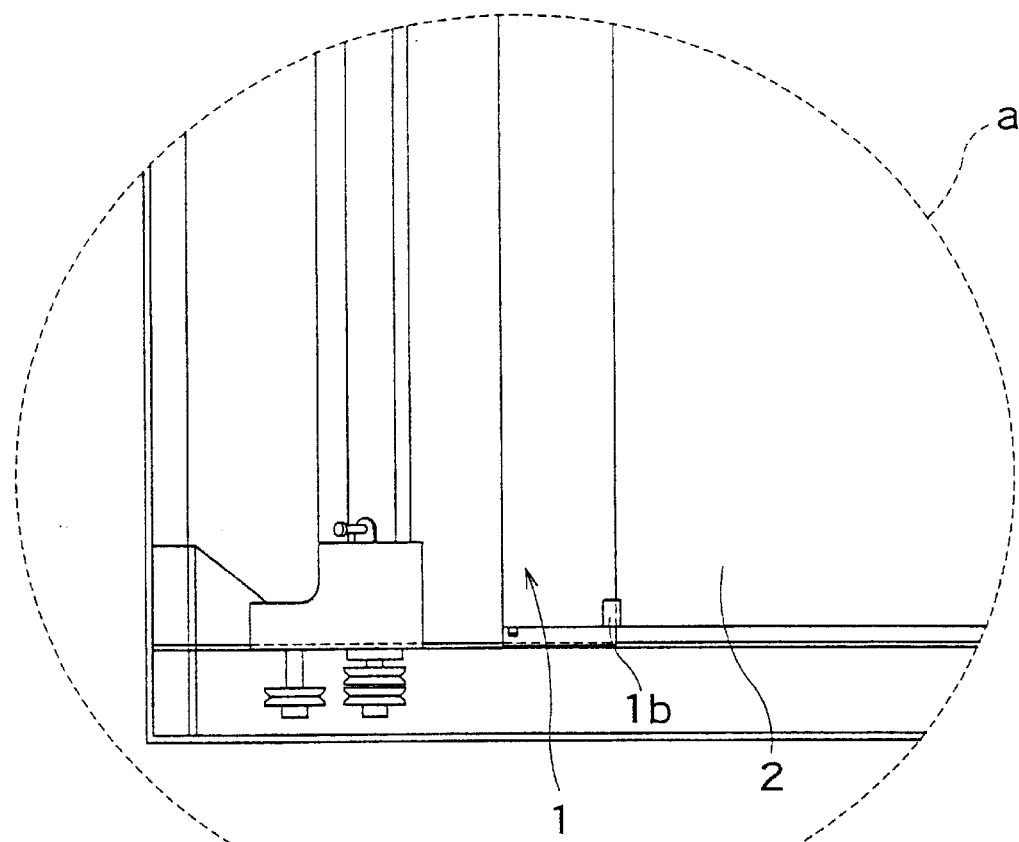
FIGS. 2A and 2B are enlarged views of a portion near a script scale (script positioning plate) in the imaging device according to the first embodiment of the invention, and they are a top view and a cross-sectional view thereof, respectively.
Figure 2B:
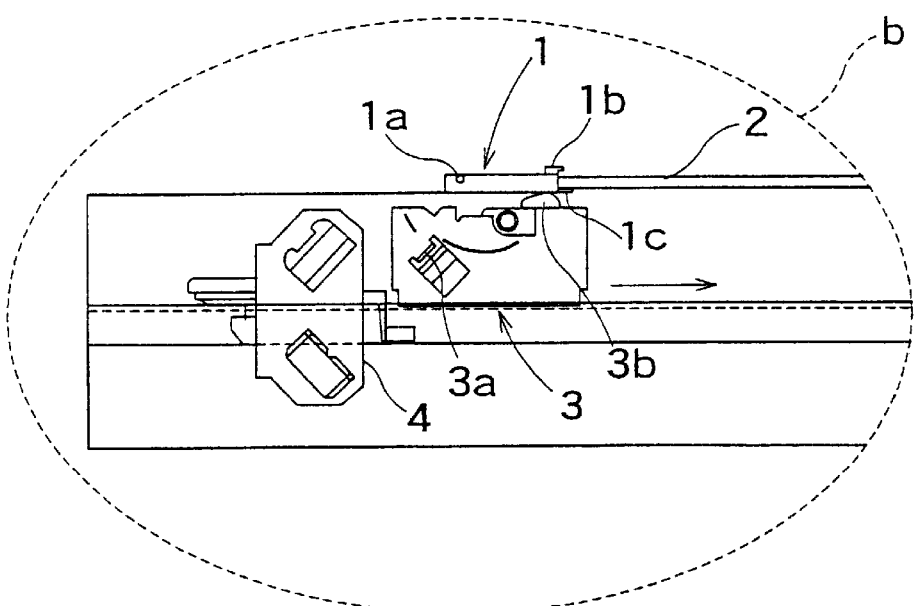

FIGS. 2A and 2B are enlarged views of portions a, b of the imaging device near the script scale 1. FIGS. 2A and 2B are a top view and a cross-sectional view thereof, respectively. Reference numeral 1 designates the script scale (script positioning plate), 2 designates the script glass plate, 3 designates the first carriage and 4 designates the second carriage. In the script scale 1, reference numeral 1a designates a script scale operation hinge, 1b designates a stopper and 1c designates a protuberance regulating stopper. In the first carriage 3, reference numeral 3a designates a mirror and 3b designates a script scale supporter (script positioning plate supporter).

The script scale 1 is provided on one end portion of the script glass plate 2 and supported around a second axis crossing substantially at a right angle with a first axis connecting the said one end and the other end of the script glass to pivot up and down about the script scale operation hinge 1a as a fulcrum. By pivoting up and down, the script scale 1 can selectively take a first position where it lies substantially horizontally and a second position where it inclines downward. FIG. 2B shows it in the first position. In this status, the upper surface of the script scale 1 is in a level above that of the scale glass 2, and there is a difference in height between them. Further, for the purpose of controlling the movable range of the script scale 1, the script scale 1 is provided with a stopper 1b and a protuberance regulating stopper 1c.

The script scale supporter 3b is located under the script scale 1 to support it from the bottom. The script scale supporter 3b can selectively take a support position or a support release position relative to the script scale, and FIGS. 2A and 2B show it in the support position. This script scale supporter 3b is mounted on the first carriage 3 to operate integrally with it.

Next explained are operations of the script scale. The present device permits the upper surface of the script scale to lie in a level higher than the upper surface of the script glass plate during the standby period ready for reading a script, and permits the upper surface of the script scale to lie in a level lower than the upper surface of the script glass plate while a script is read. These operations are explained below with reference to the drawings.

Figure 3:
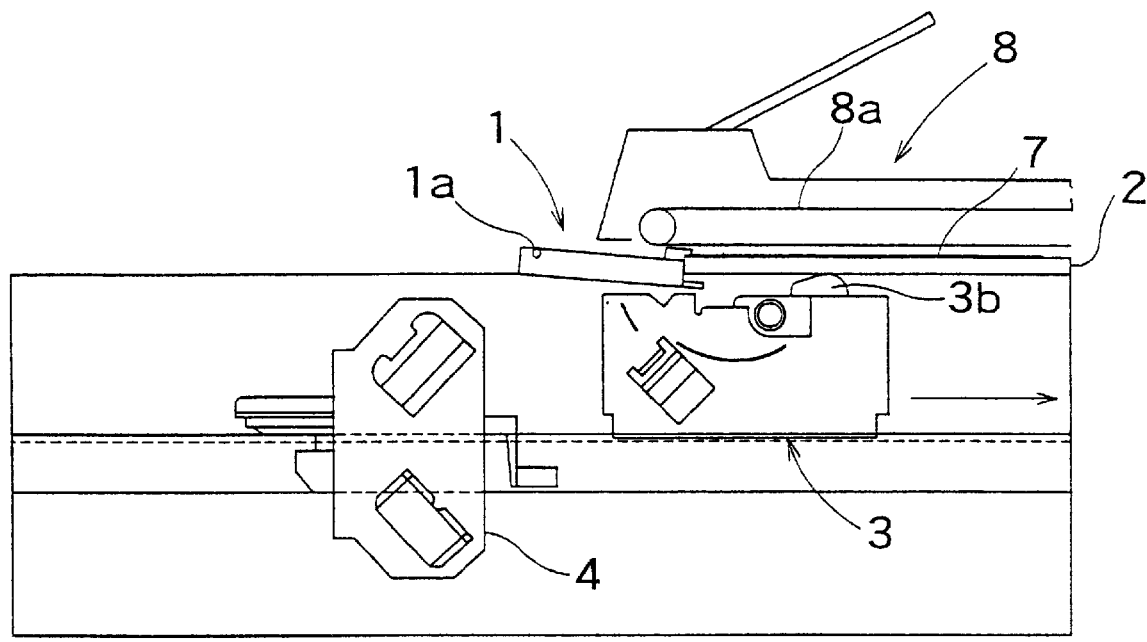
FIG. 3 is a cross-sectional view that illustrates a process of the function subsequent to that of FIG. 2B.

FIG. 3 shows the device during a script reading operation. Reference numeral 1 designates the script scale, 2 designates the script glass plate, 3 designates the first carriage, 4 designates the second carriage, 7 designates the script and 8 designates the automatic script feeder. In the script scale 1, reference numeral 1a designates the script scale operation hinge. In the first carriage 3, 3b designates the script scale supporter. In the automatic script feeder 8, 8a designates the conveyor belt. The conveyor belt 8a is provided to extend over the script scale 1 and the script glass plate 2, and it also functions to guide and hold the script 7 against the script glass plate 2.

As explained above, the script scale 1 can pivot up and down to selectively take the first position where it extends substantially horizontally and the second position where it declines downward. FIG. 3 shows it in the second position.

The first carriage 3 moves to a reading position when it reads the script. The script scale supporter 3b changes its position in synchronism with this movement. That is, during the standby period ready for reading the script, the script scale supporter 3b is located in the support position for supporting the script scale 1 from the bottom thereof (FIG. 2B). Then, upon actually reading the script, the script scale supporter 3b charges in the support release position (FIG. 3), and permits the script scale 1 to pivot downward. The script scale supporter 3b has a guide plane on its upper surface, and the script scale 1 gradually pivots downward along the guide plane when the script scale supporter 3b moves from the support position to the support release position. The script scale 1 rotates about the script scale operation hinge 1a to pivot downward to a position in which the script scale lower position stopper 1b engages the script glass plate 2. In this position, there is substantial no difference in height between the script scale 1 and the script glass plate 2.

After the script is read, the script scale supporter 3b moves to the support position, and the script scale 1 gradually pivots upward along the guide plane of the script scale supporter 3b. Eventually, the script scale supporter 3b returns to the support position, and again supports the script scale 1 from the bottom. As a result of this movement, the script scale 1 moves upward, and a difference in height is again produced between the script scale 1 and the script glass plate 2. These up-and-down operations of the script scale 1 are repeated thereafter.

Next referring to FIG. 3, operations for setting a script by using the automatic script feeder are explained below.

Figure 5A:
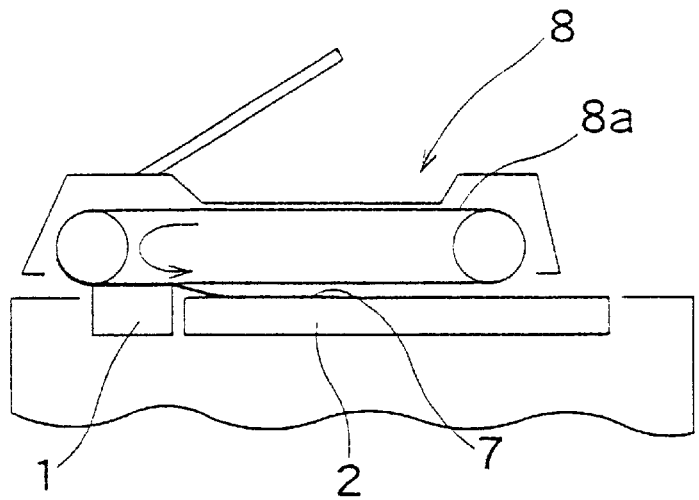
FIGS. 5A and 5B are schematic diagrams that illustrate the function of a conventional automatic script feeder, one diagram showing the function of transporting a script onto a script glass plate (script setting plate) and another diagram showing the function of positioning the script in place.
Figure 5B:
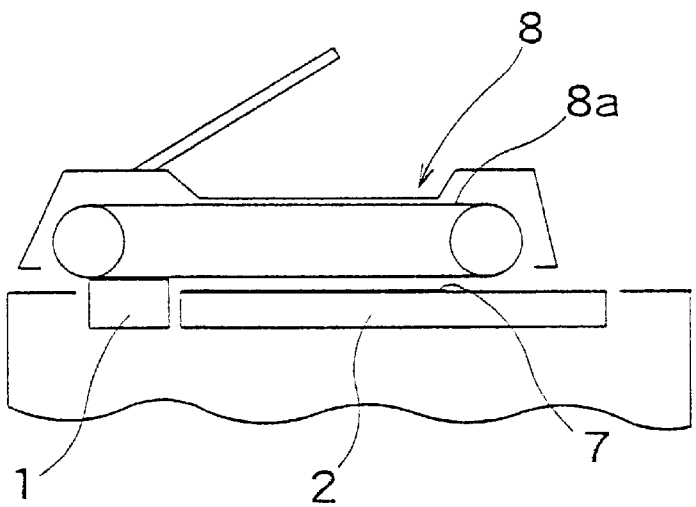

First, the script 7 is transported onto the script glass plate 2 by the conveyor belt 8a of the automatic script feeder 8, and it is placed in the proper position relative to the script scale 1. Operations of the automatic script feeder progress in the same manner as those of the conventional automatic feeder already explained with reference to FIGS. 5A and 5B. Since the script scale 1 projects above the upper surface of the script glass plate 2 during the period for positioning the script, position of the script is readily determined. Regarding techniques for positioning a script, there is a method (called an abutting mode) in which the conveyor belt 8a once over-transports the script 7 to a position slightly apart from the script scale 1 and thereafter moves it back into engagement with the script scale 1.

Figure 4:
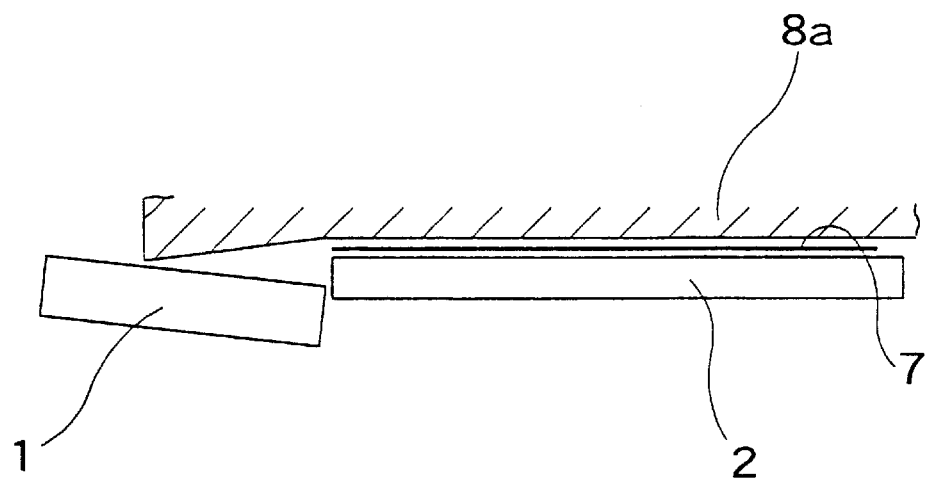
FIG. 4 is a schematic diagram that illustrates a status of a script in the imaging device according to the invention.

Once a reading operation starts, the script scale is pivoted downward, thereby bring the script into contact with the conveyor belt. FIG. 4 schematically illustrates an aspect of the script under that operation. In FIG. 4, reference numeral 1 designates the script scale, 2 designates the script glass plate, 7 designates the script, and 8a designates the conveyor belt. Since the script scale 1 lies in a level lower than the upper surface of the script glass plate, the script 7 comes into close contact with the conveyor belt 8a and also comes into close contact with the script glass plate 2.

After the reading operation is completed, the script scale is moved upward. Then, the script 7, already read, is sent to the script discharge port by the conveyor belt 8a of the automatic script feeder 8. Simultaneously, another new script is placed in the proper place relative to the script scale 1. During this operation, it is easy to determine the position of the script because the script scale 1 projects from the level of the upper surface of the script glass plate 2.

Thereafter, these operations are repeated.

When the automatic script feeder is not used, a reading operation is executed by previously putting the script 7 on the script glass plate 2 and fixing it at the position of the script scale 1, and then guiding the script 7 onto the script glass plate 2 with the conveyor belt 8a. Operations of the script scale 1 progress in the same manner as the case using the automatic script feeder, and downward movement of the script scale 1 is limited to the period of reading a script.

Next explained are meritorious effects obtained by the device described above.

Figure 6:
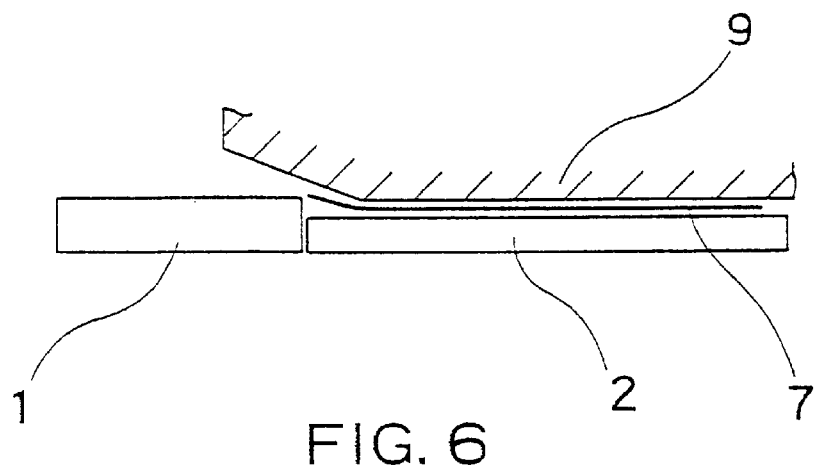
FIG. 6 is a schematic diagram that illustrates a status of the script in a conventional imaging device.

According to the present device, absolutely no image noise is produced near the script scale. This results from the facts described below. That is, the conventional device had the problem that the projecting configuration of the script scale disturbed close contact between the script-pressing cover and a part of the script near the script scale, the script floated up near the script scale, and image noises were produced thereby (FIG. 6). The device according to this invention, however, employs a system in which the script scale is lowered below the level of the upper surface of the script glass plate while the script is read, and can improve the contact between the script-pressing cover and the script even near the script scale (FIG. 4). This prevents the script from floating up in the area near the script scale thereby eliminates image noise. It is conceivable to lower the script scale, bringing its upper surface into alignment with the upper surface of the glass plate. Such a case, however, would be somewhat difficult.

Further, the present device maintains the same positioning mode of a script as used in the conventional device because downward movement of the script scale 1 is limited to the period for reading a script, and at the times of operation, the script scale takes the same position as that in the conventional device.

Additionally, the present device can improve the reliability of up-and-down movements of the script scale because such movements of the script scale in the present device are physically linked with those of the first carriage, and no other particular means is required to detect, compute or transmit the timing for movements of the script scale.

Moreover, the present device can be manufactured economically because the script scale in this device comes into physical contact with the first carriage, and no other special driving mechanism is required for operating the script scale.

Vibration might be produced by up-and-down movements of the script scale. However, this is immaterial because up-and-down movements occur only before or after the script reading operation and never occur when the script is being read.

Furthermore, the noise problem during the up-and-down movements of the script scale can be solved by making the script scale supporter 3b of an elastic material.

What is claimed is:

1. An imaging device comprising:
   a script setting plate for setting thereon a script to be read;
   a script positioning plate located near one end of said script setting plate and supported for up-and-down movements around a second axis approximately intersecting with a first axis connecting said one end of the script setting plate and the other end thereof to selectively take a first position or a second position, such that, in said first position, said script positioning plate lies horizontally in a level for an upper surface thereof to be higher than an upper surface of said script setting plate and makes a level difference between said upper surfaces, and in said second position, said script positioning plate makes substantially no level difference between said upper surfaces;
   a script positioning plate supporter selectively taking a support position under said script positioning plate in said first position for supporting same from the bottom thereof or a support release position shifted nearer to said other end to permit a downward rotation of said script positioning plate to said second position, said script positioning plate supporter taking said support position in a standby period ready for reading a script, and taking said support release position in a period for actually reading a script; and
   a script-pressing cover extending over said script positioning plate and said script setting plate to guide a script against said script setting plate.

2. An imaging device according to claim 1 wherein said script positioning plate includes a stopper configured to get into contact with said script setting plate to prevent said script setting plate from excessively rotating upon a rotation thereof from said first position to said second position.

3. An imaging device according to claim 2 wherein said script positioning plate supporter is configured to automatically change its position synchronously with operations of a script scanner in said imaging device.

4. An imaging device according to claim 3 wherein said scanner is configured to stay at an initial position below said one end of the script setting plate in said standby period for reading a script, then move toward said other end during said period for actually reading a script, and return to said initial position after the script is read.

5. An imaging device according to claim 4 wherein said script positioning plate supporter is fixed onto said scanner.

6. An imaging device according to claim 5 wherein said script-pressing cover is in form of a flat plate.

7. An imaging device according to claim 5 wherein said script-pressing cover is an endless track-type conveyor belt in an automatic script feeding system.

8. An imaging device according to claim 3 wherein said script positioning plate supporter is configured to operate integrally with said scanner.

9. An imaging device according to claim 8 wherein said script positioning plate provides on an upper surface thereof a guide plane rising from said one end to said other end, said script positioning plate being gradually rotated downward or upward along said guide plane when said script positioning plate supporter moves from said support position to said support release position or vice versa.

10. An imaging device according to claim 1 wherein said script positioning plate supporter is configured to stay in said support position during said standby period ready for reading a script, then move to said support release position in said period for actually reading a script and return to said support position after the script is read.

11. An imaging device according to claim 1 wherein said script-pressing cover is in form of a flat plate.

12. An imaging device according to claim 1 wherein said script-pressing cover is configured to be an endless track type conveyor belt in an automatic script feeding system.

13. A method for pressing down a script in an imaging device, characterized in making a first condition and a second condition which can be changed from one to the other,
   in said first condition, a script scanner being at an initial position, a script positioning plate supporter being at a support position for supporting a script positioning plate, said script positioning plate being supported by said supporter from underside, an upper surface of said script positioning plate being in a level above that of a script setting plate, and a script-pressing cover extending over said script positioning plate and said script setting plate, in said second condition, said script scanner being at a script reading position, said script positioning plate supporter being at a support release position, said script positioning plate losing the support from underside, said upper surface of said script positioning plate being in a level below that of said script setting plate, and said script-pressing cover extending over said script positioning plate and said script setting plate; wherein said script positioning plate being held in said first condition during a standby period ready for reading a script; said script scanner being moved toward the position of said second condition when a script reading operation is started, and said script positioning plate supporter being moved in response to the movement of said script scanner to release the support by said supporter and permit said script positioning plate to rotate downward, thereby to change it into the second condition in a period for actually reading a script and then return it into said second condition in the period ready for reading a script.

14. The method for pressing down a script according to claim 13 wherein the downward rotation of said script positioning plate is stopped by bringing a stopper of said script positioning plate into contact with said script setting plate.

* * * * *